United States Patent [19]

Kramer, Jr.

[11] Patent Number: 5,560,396
[45] Date of Patent: Oct. 1, 1996

[54] RIGID END SOCKET FOR FLEXIBLE TUBING AND METHOD OF MAKING SAME

[76] Inventor: Vance M. Kramer, Jr., 26301 Carrington, Perrysburg, Ohio 43551

[21] Appl. No.: 288,932

[22] Filed: Aug. 10, 1994

[51] Int. Cl.$^6$ ................................ F16L 9/18; F16L 57/00
[52] U.S. Cl. ........................ 138/109; 138/121; 138/89; 285/238; 264/285; 264/294
[58] Field of Search ..................................... 138/109, 121, 138/122, 89; 264/285, DIG. 66, 294; 285/238, 149

[56] References Cited

U.S. PATENT DOCUMENTS

| | | | |
|---|---|---|---|
| 99,018 | 1/1870 | Smith | 138/109 |
| 3,131,954 | 5/1964 | Kramer et al. | 138/109 |
| 3,688,802 | 9/1972 | Bauman et al. | 138/109 |
| 3,899,006 | 8/1975 | Champleboux et al. | 138/109 |
| 4,234,019 | 11/1980 | Hornor et al. | 138/109 |
| 4,259,553 | 3/1981 | Tanaka et al. | 138/109 |
| 4,267,863 | 5/1981 | Burelle | 138/109 |
| 4,323,089 | 4/1982 | Kadano et al. | 138/109 |
| 4,449,742 | 5/1984 | Toerner et al. | 138/109 |
| 4,523,738 | 6/1985 | Raftis et al. | 138/109 |
| 4,643,229 | 2/1987 | Hickin | 138/109 |
| 5,062,457 | 11/1991 | Timmons | 138/109 |

FOREIGN PATENT DOCUMENTS 7811706  6/1979  Netherlands ........................... 138/109

*Primary Examiner*—James E. Bryant, III
*Attorney, Agent, or Firm*—Rankin, Hill, Lewis & Clark

[57] ABSTRACT

A rigid end socket for flexible tubing is made by folding an axial length portion of a flexible resilient elastomeric tubing around a rigid metal collar having a substantial axial length. The collar is thus embedded in the end of the tubing to provide a rigid end socket that is capable of receiving an end plug or a coupling device. The end plug or coupling device may be tightly seated in the socket by inserting it therein and by using axial pressure to radially expand the body portion within the collar.

4 Claims, 2 Drawing Sheets

RIGID END SOCKET FOR FLEXIBLE TUBING AND METHOD OF MAKING SAME

This invention relates to the manufacture of flexible resilient elastomeric tubing and especially to the provision of a reinforced end socket at one or both ends of a length of such tubing. More particularly, the invention relates to a rigid end socket with sufficient strength and rigidity to enable it to be connected to various types of couplers or end plugs. The invention is especially adapted for flexible tubing formed from a sleeve of uncured rubber that is manipulated into a rudimentary shape on a forming mandrel prior to curing.

The invention has particular utility in connection with the flexible tubing and methods of manufacture disclosed in U.S. Pat. Nos. 3,168,604; 3,304,581; 3,669,586; 3,705,780; 3,975,129; 4,053,275; 4,113,828; 4,308,228; and/or 4,360,493.

In some applications for the flexible rubber tubing manufactured in accordance with the above patents, which are incorporated by reference herein, it is desirable to connect an end of the tubing to a coupling device or in some instances, to have an end plug tightly fitted and secured in one end of the tube. Because the tube is inherently flexible and resilient, the end portion of the sleeve, in normal circumstances, has insufficient strength and rigidity to accommodate the stresses and the pressures often associated with couplers and end plugs.

In a particular application, it may be desirable to close the end of the rubber tubing with a type of end plug that utilizes, for example, a cylindrical body of elastomeric material and a means for expanding the main body of the plug radially outwardly such as by applying axial pressure to tightly grip the interior surface of the surrounding socket. Such end plugs are readily available for this type of use.

However, unless the end of the flexible resilient tubing is in some way reinforced, it will not retain the radially expandable plug since the flexible tubing merely flexes outwardly to accommodate the radial expansion. Therefore, insufficient gripping force is achieved.

As disclosed in the patents listed above, corrugated tubing with annular helical corrugations is often made with external forming devices including axially spaced annular disks or helices that are employed with forming mandrels and air pressure systems to produce embryonic corrugations in uncured rubber sleeves. Each time a tube is formed, the external forming device is placed over a forming mandrel on which a sleeve of uncured rubber has been positioned and the sleeve is radially expanded so that it bulges into the spaces between the disks or turns of the helices to form creases between the bulges. The external forming member and sleeve are then collapsed axially so that the sleeve is compressed concertina fashion. The creases, together with adjacent bulges, provide embryonic corrugations.

Then the forming member is axially extended together with the sleeve so that the sleeve may be removed from the forming mandrel and from within the forming member. The uncured rubber sleeve is then placed on a cylindrical curing mandrel where it is axially foreshortened, concertina fashion into a corrugated form with a desired spacing between adjacent annular or helical corrugations. The curing mandrel with the sleeve on it is then placed in an oven to cure the sleeve and set the corrugations.

The method and apparatus thus described have been used to produce flexible tubing of both circular and non-circular cross-sectional form with either annular or helical corrugations. Such tubing is used to great advantage in many and various applications. As indicated above, however, it is often desirable to provide a length of the tubing thus described with a rigid reinforced end socket. While various types of reinforcement have been used in the past such as the provision of a helical metal reinforcing member around the outside of the end portion of the tubing, and in one instance the provision of a annular washer embedded in the end of the sleeve to provide a radial flange (such as that shown in U.S. Pat. No. 3,131,954), prior art practices have not produced an end socket having the desired capabilities.

SUMMARY OF THE INVENTION

In accordance with the present invention, there is provided a rigid end socket for a length of flexible rubber tubing, wherein the socket is capable of receiving a tube coupler or a radial expandable end plug in a tightly and firmly retained manner. The end socket has a collar of rigid material such as metal which is so positioned as to have an inner axial length portion of the tubing located within the collar and engaging and covering the interior surface thereof. The socket also has an outer axial length portion of the tubing which is connected to the inner axial length portion and folded about the outer surface of the collar so as to be located entirely around the collar, engaging and covering the exterior surface thereof. With the resulting arrangement, the rigid collar is embedded in an end of the tubing to provide a rigid end socket capable of receiving, for example, an end plug which may be tightly seated in the socket by inserting it therein and through application of axial pressure radially expanding an elastomeric body portion of the plug radially outwardly into tight gripping engagement with the rubber-faced interior surface of the socket.

In accordance with the method for making the rigid end socket, the length of flexible tubing is fabricated according to the steps of:

1. Placing a sleeve of uncured rubber on a forming mandrel;
2. Placing a collar of rigid material over an end of the sleeve at a location spaced axially from the end of the sleeve a distance approximately equal to the axial length of the collar to define an outer length portion of the sleeve;
3. Folding the outer length portion over the outer surface of the collar to enclose the collar between the inner length portion and the outer length portion; and
4. Curing the resulting rubber sleeve assembly to produce a flexible tube with a rigid socket portion at one end thereof.

DESCRIPTION OF THE PREFERRED EMBODIMENT

Figure 1:
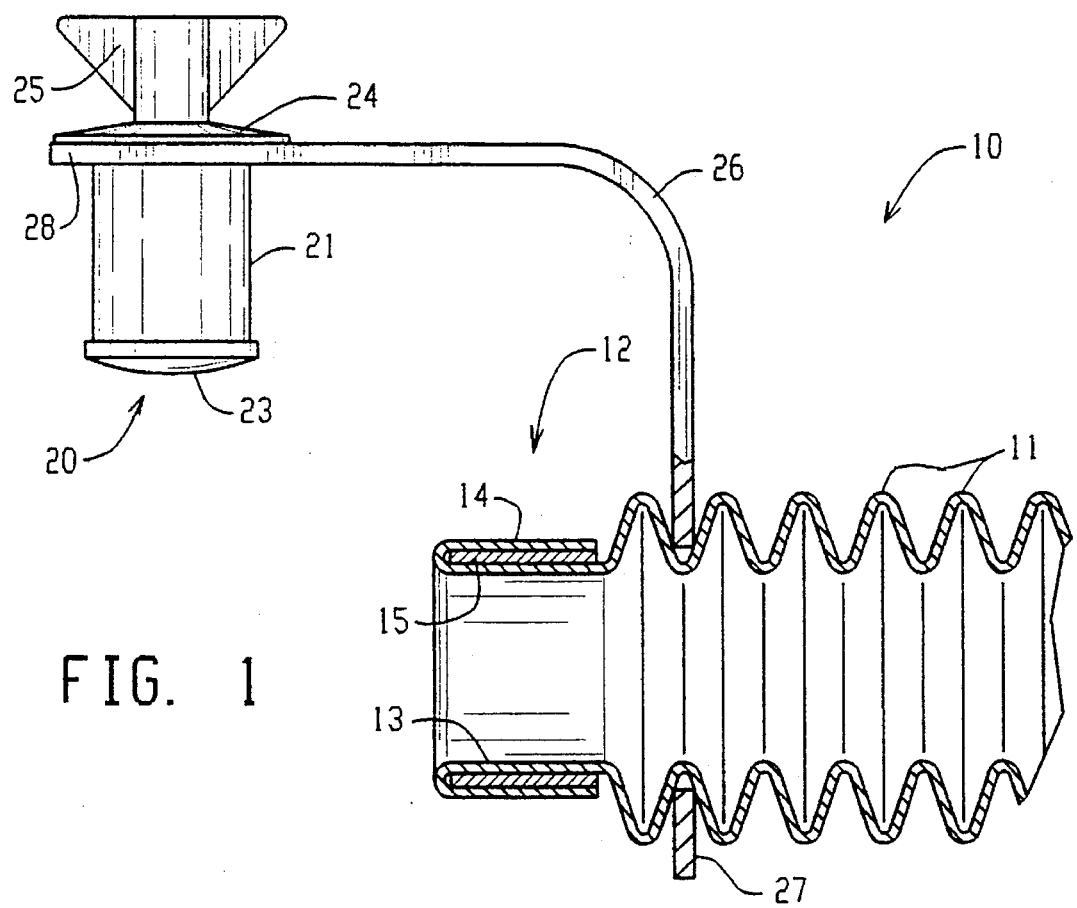
FIG. 1 is a fragmentary elevational view with parts broken away and shown in section illustrating a length of rubber tubing with an end socket embodying the invention and also having attached thereto a plug for insertion in the socket to close the end of the socket.
Figure 2:
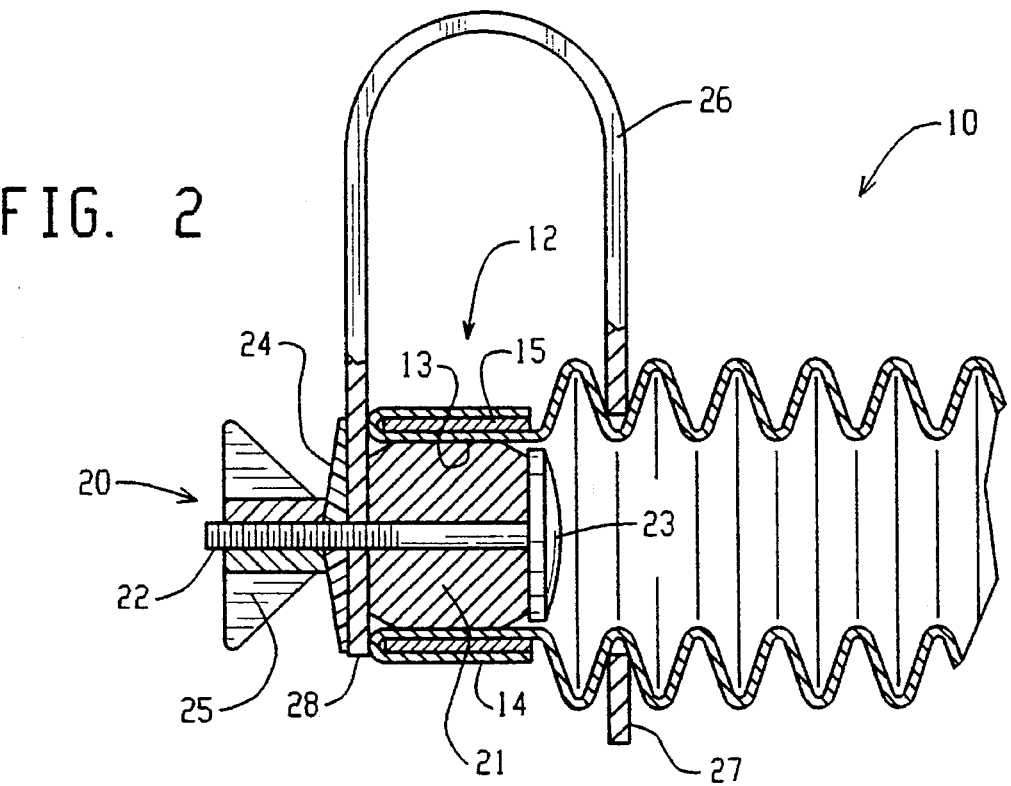
FIG. 2 is a fragmentary sectional view with parts broken away and shown in section showing the end socket of the rubber tubing with the plug inserted and tightly secured therein.

Referring more particularly to the drawings there is shown in FIGS. 1 and 2 a length of corrugated rubber tubing 10 that has a central length portion with annular corrugations 11 formed therein in accordance with the corrugated rubber tubing disclosed in the patents listed above and a rigid reinforced end socket 12. In accordance with the invention, the end socket 12 comprises three coaxial layers or laminations including an axial inner length portion 13 of tubing, an axial outer length portion 14 of tubing and a metal collar 15 interposed between the length portions 13 and 14. In the embodiment shown, the socket is of cylindrical form, however, it may also take other forms in different circumstances such as oval, rectangular, etc.

The end socket 12 is adapted for use in connection with an end plug 20 which is adapted to be tightly seated in the socket 12. The end plug 20 is a product readily available for the purpose intended and includes a cylindrical rubber body 21 and a threaded fastener 22 extending axially therethrough. The fastener 22 has a large head 23 adapted to bear against the inner end of the plug. The opposite end of the threaded fastener has a flat washer 24 thereon and a wingnut 25 which is used to tightly seat the end plug 20 in the socket 12. If desired, a retainer 26 may be used to secure the plug 20 to the rubber tubing 10 when the plug is not in use. The retainer 26 has an annular end ring 27 at one end which fits in the groove portion between the corrugations of the main length portion 11 and an end ring 28 positioned between the washer 24 and the outer end of the rubber body 21.

As illustrated in FIG. 2, when the end plug 20 is inserted in the socket 12, the wingnut 25 may be tightened down on the threaded fastener 22 to cause axial compression of the rubber body 21 and resulting radial expansion. The radial expansion forces the outer cylindrical surface of the rubber body 21 into tight engagement with the inner surface of the socket 12 to secure the plug 20 in position. It will be noted that without the metal collar 15 to reinforce the socket, the tightening of the wingnut would merely serve to expand the end portion of the rubber tubing without causing any tight engagement that would retain the plug in position. By using the metal collar 15, sufficient rigidity is achieved to enable the end plug 20 to be effectively utilized. Also, coupling devices which require a rigid socket to provide adequate seating may be used to couple the rubber tubing in a desired manner.

Figure 3:
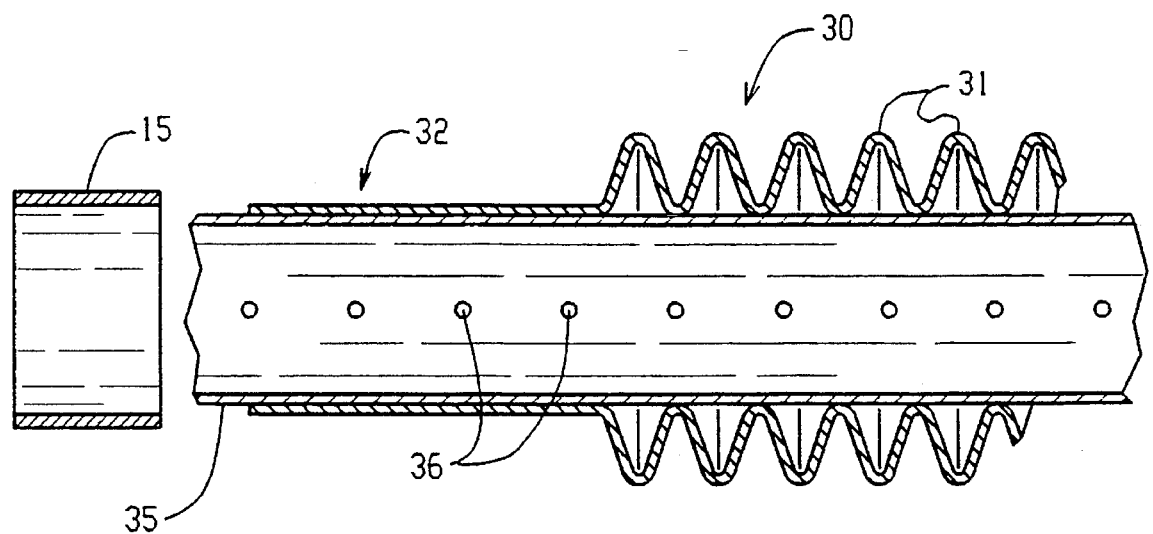
FIG. 3 is a fragmentary sectional view illustrating the method of the invention and showing a portion of a sleeve of uncured rubber with rudimentary corrugations formed therein and also showing, spaced from one end of the sleeve, a metal collar to be used in forming the end socket of the invention.
Figure 4:
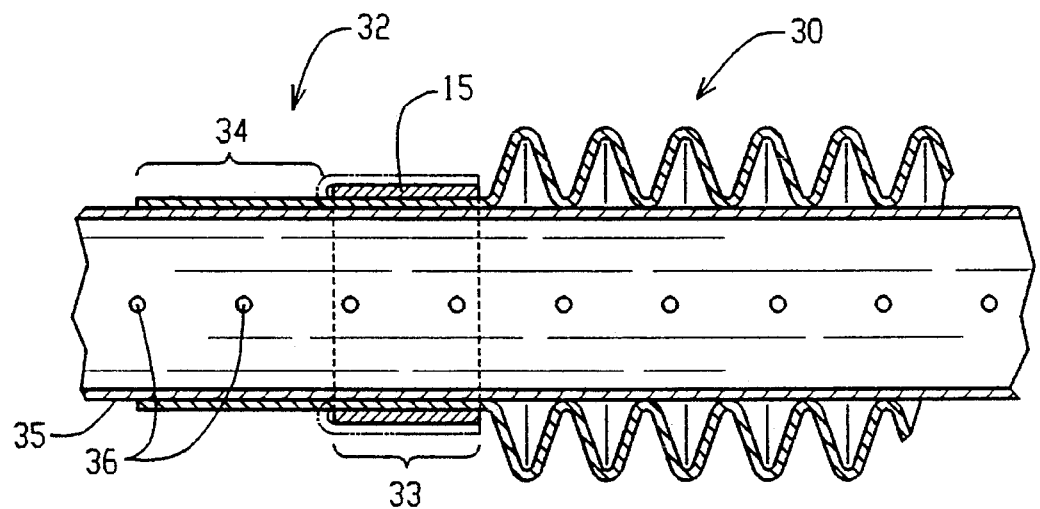
FIG. 4 is a fragmentary sectional view showing the positioning of the collar over an end of the sleeve and showing an outer end portion of the sleeve folded back over the collar in preparation for curing.

FIGS. 3 and 4 illustrate the manner in which the metal collar 15 is embedded in the rubber material to form the end socket 12. In accordance with the method of the invention, an extruded sleeve 30 of uncured rubber of a desired size for forming the particular product to be manufactured, is initially placed on the end of a forming mandrel 35 that is connected at one end to a pressure supply means. The mandrel is supported in cantilever fashion by a suitable support (not shown).

The mandrel 35 is initially coated with a lubricant such as a silicone composition. Also, the sleeve 30 may be lubricated by emersing it in a bath containing the desired lubricant. The mandrel 35 has a plurality of radial ports 36 formed therein along a discrete axial length portion thereof.

Initially, the sleeve 30 is disposed on the mandrel 35 and an external form (not shown) is positioned over the mandrel and sleeve. The external form is used to provide the desired preliminary shaping of the sleeve, i.e. to form rudimentary corrugations 31 therein as accomplished in a manner similar to the general method of U.S. Pat. Nos. 3,168,604; 3,304,581; 3,669,586; 3,705,780; 3,975,129; 4,053,275; 4,113,828; 4,308,228; and/or 4,360,493.

FIG. 3 illustrates the uncured rubber sleeve 30 positioned on the mandrel 35 after the rudimentary corrugations 31 have been formed in the central portion thereof. The end portion 32 remains on the mandrel in its original unformed condition and the metal collar 15 is shown spaced from the end of the sleeve prepatory to positioning it over the end length 32.

At the appropriate time, the metal collar 15 is slid over the mandrel 30 and end length 32 into a position spaced from the end of the sleeve and overlying an inner length portion 33 (FIG. 4). This leaves an outer length portion 34 between the outer end of the collar 15 and the end of the sleeve, that is approximately equal or slightly greater than the axial length of the collar. At this point, the outer length portion 34 is folded back over the collar so that the collar is entirely enclosed within the uncured rubber material as shown in dashed lines in FIG. 4. This is easily accomplished since the rubber in its uncured condition is quite pliable and formable.

Once the forming of the rudimentary corrugations 31 and the assembly of the metal collar 15 between the inner length portion 33 and outer length portion 34 is completed, the resulting product is cured to set the corrugations and produce the tubular product 10 with the rigid reinforced end socket 12 in accordance with the invention. To accomplish the curing, the mandrel 35 itself may be used to support the uncured rubber sleeve 30 or the sleeve with the rudimentary corrugations 31 may be removed from the forming mandrel 35 and placed on a curing mandrel or pole for the curing operation.

While the invention has been illustrated in connection with the forming of flexible rubber tubing with annular or helical corrugations, it will be understood that the invention may also be used in connection with various other types of rubber tubing for a variety of applications. Also, corrugated tubing of non-circular cross-section (such as oval, rectangular, etc.) may also be provided with an end socket 12 in accordance with the invention.

While the invention has been shown and described with respect to specific embodiments thereof, this is intended for the purpose of illustration rather than limitation and other variations and modifications of the specific method and product herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. A method for making a rigid end socket for a length of flexible rubber tubing, said socket being adapted to receive a radially expandible plug, comprising the steps of:

placing a sleeve of uncured rubber on a forming mandrel, placing an elongated tubular cylindrical collar of rigid material having a relatively small wall thickness and an axial length sufficient to tightly seat said radially expandible plug and substantially greater than said wall thickness, over an inner length portion of said sleeve at a location spaced axially from the end of said sleeve a distance approximately equal to the axial length of said collar to define an outer length portion of said sleeve, folding said outer length portion over the outer surface of said collar to enclose said collar between said inner length portion and said outer length portion, curing the resulting rubber sleeve assembly to produce a flexible tube with a rigid socket portion at one end thereof of sufficient rigidity and axial length to operably receive a radially expandible end plug.

2. The method of claim 1 including the steps of forming rudimentary circumferential corrugations in a central axial length portion of said sleeve spaced from said collar while said sleeve is on said mandrel and curing said sleeve with circumferential corrugations formed in said central axial length portion to provide a circumferentially corrugated length portion in said rubber tubing.

3. The product of claim 1 wherein said length of tubing is formed from a sleeve of uncured rubber.

4. In combination, a radially expandible end plug and a length of flexible rubber tubing, having a rigid end socket adapted to receive said end plug, said end socket comprising;

an elongated tubular collar of rigid material having a cylindrical interior surface and a cylindrical exterior surface, said collar having a relatively small wall thickness and an axial length sufficient to tightly seat the radially expandible plug and substantially greater than said wall thickness, an inner axial length portion of said tubing located within said collar engaging and covering said interior surface, and an outer axial length portion of said tubing connected to said inner axial length portion, located around said collar engaging and covering said exterior surface, whereby said collar is embedded in an end of said tubing to provide an elongated rigid cylindrical end socket of sufficient rigidity and axial length to receive said radially expandible end plug.

* * * * *